(12) United States Patent
Swayne et al.

(10) Patent No.: US 6,465,762 B1
(45) Date of Patent: Oct. 15, 2002

(54) BREAD PROOFING OVEN AND METHOD

(75) Inventors: Steven M. Swayne, Chattanooga; Marilyn L. Sterchi, Harrison, both of TN (US)

(73) Assignee: Maytag Corporation, Newton, IA (US)

( * ) Notice: Subject to any disclaimer, the term of this patent is extended or adjusted under 35 U.S.C. 154(b) by 0 days.

(21) Appl. No.: 09/897,945

(22) Filed: Jul. 5, 2001

(51) Int. Cl.$^7$ .............................................. A21B 1/40
(52) U.S. Cl. ................ 219/413; 219/412; 219/201; 219/400; 126/21 A; 126/369; 99/467; 99/331
(58) Field of Search ................ 219/201, 400, 219/401, 412, 413; 126/21 A, 369, 348; 99/467, 331, 468, 330, 473–476

(56) References Cited

U.S. PATENT DOCUMENTS

| | | |
|---|---|---|
| 3,518,949 A | 7/1970 | Stock |
| 4,164,643 A | 8/1979 | Peart et al. |
| 4,316,078 A | 2/1982 | Mack et al. |
| 4,885,176 A | 12/1989 | Nakakura et al. |
| 5,003,161 A | 3/1991 | Geary |
| 5,386,763 A | 2/1995 | Chen |
| 5,432,321 A | 7/1995 | Gerl |
| 5,463,940 A | * 11/1995 | Cataldo ........................ 99/476 |
| 5,510,127 A | 4/1996 | Wong et al. |
| 5,737,232 A | 4/1998 | Wetekamp |
| 5,786,568 A | 7/1998 | McKinney |
| 6,323,464 B1 | * 11/2001 | Cohn ........................ 219/401 |

FOREIGN PATENT DOCUMENTS

| | | |
|---|---|---|
| JP | 62-293021 | 12/1987 |

\* cited by examiner

*Primary Examiner*—Teresa Walberg
*Assistant Examiner*—Shawntina T. Fuqua

(57) ABSTRACT

A domestic oven is controlled for use in proofing and cooking bread. In accordance with the invention, at least one heating element of the oven is first energized to bring the oven to a first high temperature representing an overshoot temperature which allows activation of yeast inside dough. Once the first high temperature is reached, the temperature is allowed to drop to a second level which is maintained by cycling the heating element(s) on and off to allow proofing of the bread. A fan is also provided to circulate air in the oven when a rapid proofing sequence is selected.

20 Claims, 3 Drawing Sheets

BREAD PROOFING OVEN AND METHOD

BACKGROUND OF THE INVENTION

1. Field of the Invention

The present invention relates to a domestic bread proofing oven and a method for controlling the oven. Upon activation for a rapid proofing operation, the oven of the invention will heat-up to a first temperature, before cooling and being maintained at a second lower temperature. This procedure allows for proofing of uncooked dough, selectively at an increased rate, without killing the yeast.

2. Discussion of the Prior Art

Generally, the process for making bread at home includes mixing yeast, sugars, flower, liquids, and salt in proper proportions to form a dough, which is then repeatedly kneaded and allowed to rise for a precise period of time. Traditionally, the ingredients were mixed by hand and the dough was set aside to rise. Following the rising period, the dough is then baked and cooled.

Once the yeast has been added, the dough begins to rise. This period is called proofing. During proofing, the yeast is growing and fermenting as it is consuming the added sugar. During this fermenting process, the yeast emits carbon dioxide and other gasses which bubble through the dough causing the dough to expand, or rise.

Because proofing often takes an extended period of time, and health reasons prevent leaving the dough unrefrigerated for as long as it takes for bread to proof, proofing is often conducted in a cooled environment such as a refrigerator. But yeast fermentation is slowed considerably when in a cooled environment. Therefore, placing the unproofed bread inside a refrigerator extends the proofing time extensively.

Similarly, conventional ovens cannot be used to proof dough because the lowest available temperature settings will kill the yeast before proofing has been completed. Specifically, it is desired to maintain the dough at a temperature just high enough to allow the yeast to properly grow, while neither cooking the dough nor killing the growing yeast, e.g. approximately 110° F. (43° C.). Unfortunately, traditional ovens are not provided with such settings.

Recently, machines have been developed which automates the entire bread making process. Users simply place the correct measurements of ingredients into the machine and the machine takes over. Automatically, the ingredients are mixed forming a dough, and the dough is permitted to rise. Once a specific amount of rising time has elapsed, the baking procedure begins. In order to make the cooking process as easy as possible, all of the ingredients are placed inside the cooking chamber. While this may make the bread making procedure significantly faster and simpler, the resulting bread is often inferior in quality.

Automatic bread making machines, while often convenient and easy to use, have additional limitations. Primarily, users are required to have a separate appliance in their kitchen, which only has limited uses. Because most kitchens have limited counter space, these automatic bread makers must be stored away when not use. This means that whenever someone wants to use one of these automatic bread makers, they need to retrieve the machine from wherever it is stored, carry it to the kitchen and, when finished, return it to storage. For homes with limited storage space, finding adequate storage is also a problem. In any event, it would be preferable to avoid the need for a dedicated domestic bread machine. Instead, it would be beneficial to specifically adapt a conventional oven for use in optimally proofing uncooked bread, preferably in a manner in which actually reduces the overall operation time.

SUMMARY OF THE INVENTION

The present invention is particularly directed to a method and apparatus for proofing bread without requiring a separate appliance by incorporating a proofing methodology into a conventional oven. The oven of this invention includes a bread proofing option which is activated via a separate control sequence. Selecting the bread proofing option activates a respective control algorithm which operates the existing heating element(s) inside the oven to allow proofing of dough therein.

In accordance with a preferred rapid proofing embodiment of the invention, the control algorithm of the invention activates the heating element(s) of the oven. First, the temperature of the oven cavity is elevated beyond that which required to proof the dough. Advantageously, this temperature overshoot allows for the quick activation of the yeast without baking the dough. Activation of the yeast starts the fermentation process, which causes the yeast to emit carbon dioxide. It is the carbon dioxide that causes the bread to rise. The remainder of the proofing process is best carried out at a temperature lower than that necessary to initially activate the yeast. Therefore, once the activation temperature is reached, the proofing oven of the invention automatically lowers the temperature of the oven cavity to a temperature high enough to proof the bread rapidly, without baking the dough.

The algorithm of the invention controls the heating element to maintain this lower temperature for a specified time. Accordingly, this lower temperature is achieved by cycling on and off the heating element at the lower temperature. This prevents the dough from reaching a temperature on either side of a target temperature. This cycling on and off of the heating element, and hence the maintenance of the oven cavity temperature, is accomplished by lowering the heat output of the heating element.

When the oven of the invention is an electric oven, the heat output can be controlled by varying the voltage to one or more of the available heating elements. During normal baking, the lower or bake heating element is energized with 240 volts. When the same heating element is used during the proofing process, 120 volts is used. This lower voltage prevents the heating element from reaching temperatures necessary to bake the unproofed dough.

Once proofing, is complete, the dough is ready for baking. At this point, the normal operations of the oven can be utilized. By providing this process in an oven which is capable of both proofing and baking the dough, the number of appliances necessary to make the bread is reduced and the overall operational efficiency and convenience is enhanced.

Additional objects, features and advantages of the present invention will become more fully apparent from the following detailed description of a preferred embodiment, when taken in conjunction with the drawings wherein like reference numerals refer to corresponding parts in the several views.

DETAILED DESCRIPTION OF THE PREFERRED EMBODIMENTS

Figure 1:
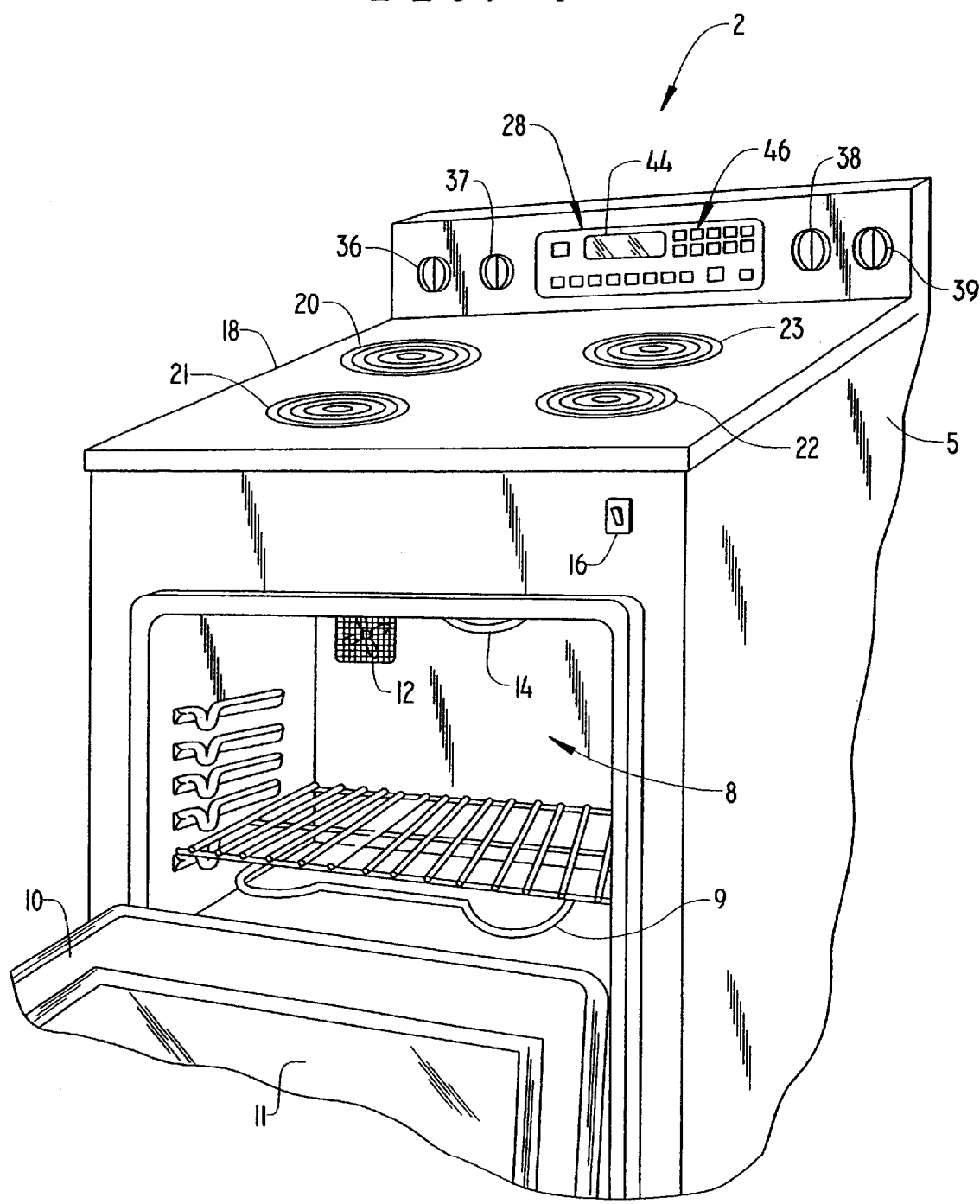
FIG. 1 is a partial perspective view of an electric range incorporating a rapid proofing system according to the invention.

With initial reference to FIG. 1, the invention is illustrated for use in connection with an electric range, generally indicated at 2. In the embodiment shown, electric range 2 includes a cabinet 5 within which is arranged an oven cavity 8 having an associated lower heating element 9 and a door 10 shown in an open condition wherein access to oven cavity 8 is permitted. Although not shown, an upper heating element could also be provided in oven cavity 8, such as for broiling operations as widely known in the art. The following description assumes that heating element 9 is of a conventional electric heating element design, but it is considered within the scope of this invention that heating element 9 may be a gas heating element or of any other conventional design. This figure also illustrates the presence of a viewing window 11 in door 10. Furthermore, within oven cavity 8, a fan 12 and an upper, broil heating element, a part of which is shown at 14, are provided. In a manner known in the art, cabinet 5 is provided with a light switch 16 which functions to turn on a light (not shown) in FIG. 1 but indicated at 17 in FIG. 2 to illuminate oven cavity 8 upon the opening of door 10.

Cabinet 5 is also provided with an associated range top 18 which supports various spaced surface heating elements 20–23 in a manner known in the art. At an upper rear portion, cabinet 5 is provided with a control panel 28. Control panel 28 includes a plurality of knobs 36–39 for use in selectively activating and deactivating surface heating elements 20–23 respectively. In addition, control panel 28 is shown to include a central display 44, such as an LED or LCD display unit (also see FIG. 2). Furthermore, control panel 28 is provided with a number pad generally indicated at 46 having buttons for the numbers zero (0) through nine (9), with the zero (0) button also functioning as a reset control button.

Although the particular features incorporated into electric range 2 could vary greatly within the scope of the present invention, for the sake of completeness in describing a preferred form of the invention, control panel 28 of range 2 is also shown to include a lower row of control buttons generally indicated at 48 which are provided to select various operational modes for range 2. For instance, the row of control buttons 48 can be used to select bake, broil and clean modes for range 2 through respective buttons 49–51. In the particular embodiment shown, an additional convection baking mode, which is essentially defined by a baking mode with the further activation of fan 12, can also be selected through button 53.

In another form of the invention, the user may program the operation of range 2 through the use of the lower row of control buttons 48, control button 53 and numeric pad 46, as well as timer buttons 62 and 63. Furthermore, buttons 66 and 67 are provided to enable a consumer to set desired countdown and clock times, in combination with numeric pad 46, respectively. Button 68 performs a stop or clear control function, while button 69 enables a consumer to turn on light 17 without opening door 10 such that oven cavity 8 can be selectively viewed through window 11. Button 70 is provided to initiate the proofing function, in accordance with this invention as will be described below. Finally, an Auto Set button 72 is provided and can be used to perform various programming functions as will also be discussed below. Of course, although various buttons are described for use on control panel 28, other types of control switches could equally be employed.

Figure 2:
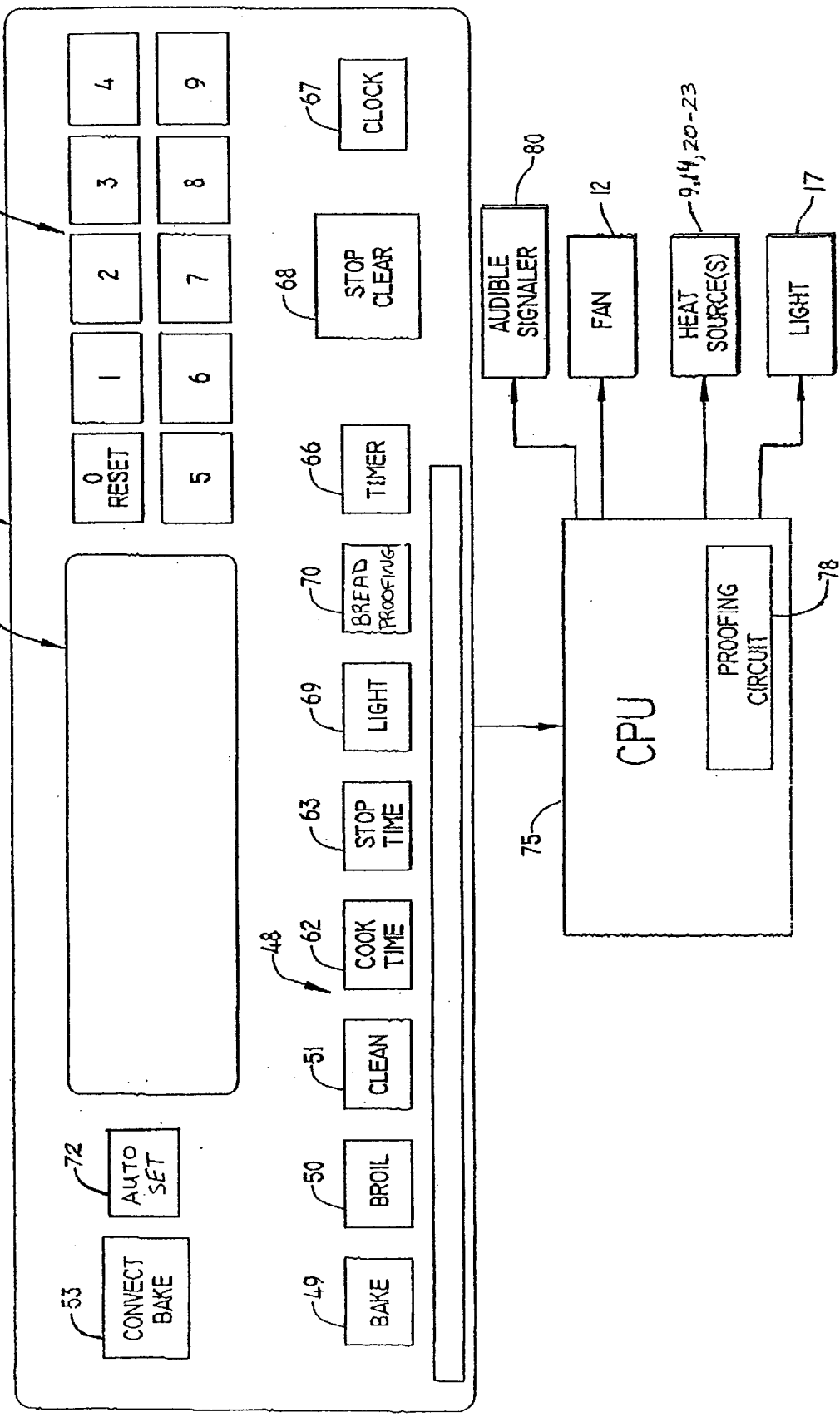
FIG. 2 is a front view of a control panel, forming part of the range shown in FIG. 1, including a schematic illustration of a control arrangement that forms part of the rapid proofing system.

FIG. 2 shows control panel 28 including an associated CPU 75 for controlling fan 12 and the heat sources of range 2, i.e., at least illustrated heating elements 9, 14 and 20–23. CPU 75 also includes proofing circuit 78, activated by button 70 as will be more fully discussed below. The operation of light 17 and heating elements 20–23 is performed in a manner known in the art, does not constitute part of the present invention and therefore will not be discussed further here. However, it will be mentioned that Auto Set button 72 can be used to assist the user in programming a cooking operation for range 2. For example, if bake button 49 is selected, the operating temperature can be set directly through number pad 46 or by pressing Auto Set button 72 once for a certain starting temperature, e.g. 350° F. (177° C.), and subsequently for adding a set temperature value, e.g. 25° F., upon each further depression of button 72. If a broil operation is selected through button 50, Auto Set button 72 can be used to toggle between "Hi" and "Low" settings for heating element 14. In any event, this operation is known in the art and only provided for the sake of completeness. Instead, the present invention is particularly directed to the manner in which CPU 75 and proofing circuit 78 are programmed to operate on a mass of dough in the preparation of bread. More particularly, proofing circuit 78 of CPU 75 operates in accordance with the present invention to allow a mass of uncooked bread dough to rise and be cooked in a controlled environment.

In using range 2, a consumer may select a desired cooking function or operational mode through control buttons 49, 50 and 53, while also establishing an operating time period for the respective heat source utilizing numeric pad 46 and timer buttons 62 and 63. Again, numeric pad 46 or Auto Set button 72 can be used to set certain operating parameters as well. In one embodiment, the selected operation will be shown by illuminating key words or symbols in central display 44. At the end of a cooking operation, it is possible to provide some type of audible or visual indicator to the consumer that the established time period has expired. This is typically done by incorporating a piezoelectric buzzer or the like as indicated in FIG. 2 at 80. The preceding description is similar to the structure described in U.S. Pat. No. 6,153,858, the entire disclosure of which is herein incorporated by reference.

Proofing circuit 78 is controlled via bread proofing button 70. Before initiating operation of range 2 in a proofing mode, an uncooked dough is formed and kneaded. Next, the user places the dough inside oven cavity 8 and presses button 70. As will be discussed further below, Auto Set button 72 can be used to toggle between "standard" and "quick" proofing operations. If a "standard" proofing operation is established, a user can select a proofing temperature through number pad 46 or the Auto Set button 72, preferably with a maximum temperature of 115° F. (46° C.). In addition, "STANDARD PROOFING" will be initially scrolled in display 44, followed by a solid "STND PROOF" for the duration of the operation. In the standard mode, CPU 75 will cycle heating element 9 and the upper broil heating element 14, with heating element 9 being operated approximately in the order of 6:1 as long as the broil element 14. If employed in a gas range, standard proofing is preferably carried out with only the operation of the lower or bake burner.

Regardless of the type of proofing to be performed, if the temperature in oven cavity 8 is above a preset temperature, preferably 200° F. (93° C.) upon activating proofing circuit 78, then the user is signaled through display 44 that range 2 must be allowed to cool down before a bread proofing operation can be initiated. Although the ability to select between standard and quick proofing operations is an aspect of the present invention, the invention is particularly concerned with the operation of range 2 when a quick proofing operation is selected through bread proofing button 70, followed by Auto Set button 72. In general, the quick proofing operation takes approximately one-half the time of the standard proofing operation.

Figure 3:
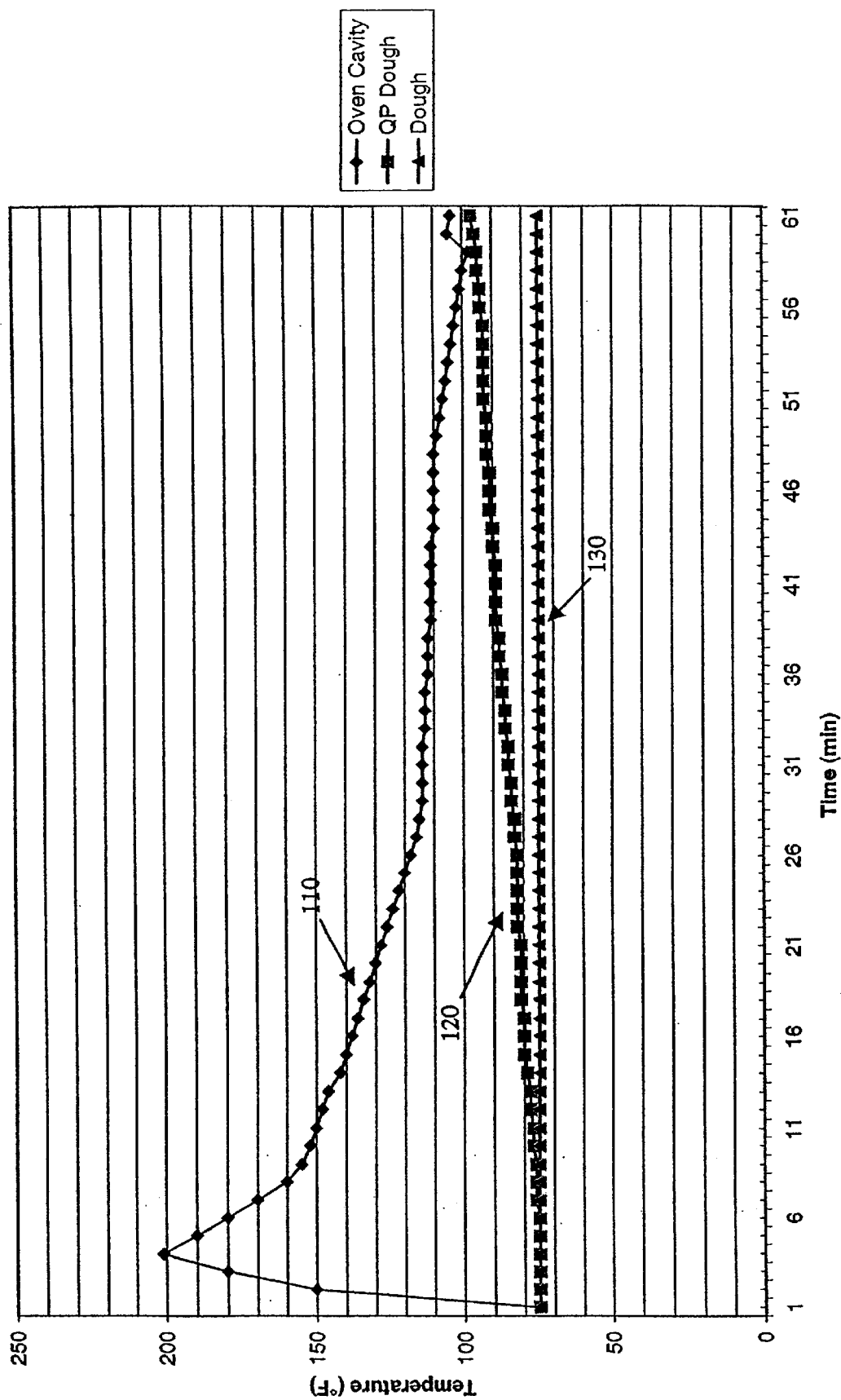
FIG. 3 is a graphical representation of the temperature of the oven cavity and dough when heated in accordance with the invention.

When rapid proofing is selected, "QUICK PROOFING" is initially scrolled in display 44. Thereafter, "QUIK PROOF" is preferably, solidly displayed for the duration of the proofing cycle. For a quick proofing operation, heating element 9, and also preferably broil heating element 14, is energized until the temperature of oven cavity 8 reaches an overshoot temperature, most preferably 200° F. (93° C.), as shown in FIG. 3. Upon reaching the overshoot temperature, heating elements 9 and 14 are deenergized, and the temperature of oven cavity 8 is allowed to cool. In the preferred embodiment shown, fan 12 is operated continuously on a low setting. In this initial stage, fan 12 aids in cooling oven cavity 8 and preventing the bread from heating too quickly. When the invention is employed in a gas range, fan 12 is also operated at a low setting, but this operation is delayed for the first minutes, preferably 5 minutes, of the proofing operation.

It is important that the temperature of the uncooked dough never be elevated sufficiently to begin cooking the dough or kill the yeast. For the duration of the proofing process, the upper and lower heating elements 9 and 14 are cycled on and off to maintain the temperature of oven cavity 8 at an a steady-state temperature, i.e. approximately between 90° F. (32° C.) and 110° F. (43° C.), preferably approximately 100° F. (37° C.). In a preferred embodiment, heating element 9 is cycled on at approximately 98° F. (36° C.) and off at 105° F. (41° C.), after the initial overshoot stage, and is operated approximately 53 minutes per hour versus 7 minutes per hour for the upper, broil element 14. If range 2 is powered electrically, this heat-up and cool down function is accomplished by varying the voltage to one or more of the heating elements 9 and 14 as well. For instance, during the final stages of the proofing process, heating element 9 only sees 120 volts, as compared to 240 volts during normal baking.

The temperature of each of oven cavity 8 and the dough is shown in FIG. 3. Line 110 indicates the temperature of the center of oven cavity 8 during a rapid proofing procedure. Line 120 indicates the temperature of the dough in range 2 during the rapid proofing procedure of the invention. Finally, line 130 shows the temperature of a mass of dough proofed at room temperature. As can be seen from FIG. 3, the temperatures of oven cavity 8 and the dough begin at approximately the same level, i.e. room temperature. Because heating elements 9 and 14 are initially energized, the internal temperature of oven cavity 8 is quickly increased until the overshoot temperature, which is shown at 200° F. (approximately 93° C.) is achieved. It must be remembered that lines 110, 120 and 130 are only typical temperature progressions in accordance with the invention, and that a variety of other graphs may result.

Although described with reference to preferred embodiments, it should readily understood that various changes and/or modifications could be made to the invention without departing from the spirit thereof. For example, control panel 28 may include more or fewer buttons representing numerous other functions. Of course, control panel 28 can take various forms and configurations in accordance with the invention. Additionally, the values utilized both as the overshoot temperature and as the steady-state temperature may be modified in order to proof different types of bread or varying quantities thereof. Furthermore, it is considered within the scope of the invention to vary the steady-state temperature to change the amount of time needed to completely proof the uncooked bread. Finally, CPU 75 can be selectively programmed to automatically initiate a cooking operation for the bread following the proofing operation. In any event, the invention is only intended to be limited by the scope of the following claims.

We claim:

1. A bread proofing oven comprising:

an oven cavity;

at least one heating element disposed inside said oven cavity;

a control panel, mounted exteriorly of said oven cavity, including a selector member for bread proofing operation for the oven, and means for controlling said at least one heating element in accordance with a bread proofing sequence upon actuation of the selector member, said controlling means being adapted to operate said at least one heating element so as to initially elevate said oven cavity to a first temperature sufficient to activate yeast in uncooked bread, to subsequently reduce the oven cavity to a second temperature and then to maintain said oven cavity substantially at the second temperature for a prerequisite period of time to at least partially proof the uncooked bread.

2. The bread proofing oven according to claim 1, wherein said first temperature is approximately 200° F. (93° C.).

3. The bread proofing oven according to claim 1, wherein said second temperature is approximately 100° F. (43° C.).

4. The bread proofing oven according to claim 3, wherein said controlling means cycles the at least one heating element on when said oven cavity reaches 98° F. (36° C.) and off when said oven cavity reaches 105° F. (41° C.).

5. The bread proofing oven according to claim 1, wherein said at least one heating element constitutes a bake element.

6. The bread proofing oven according to claim 1, wherein said at least one heating element is electrically activated.

7. The bread proofing oven according to claim 6, wherein said controlling means is adapted to operate said at least one heating element at a first voltage when initially elevating the oven cavity to the first temperature and at approximately one-half the first voltage when maintaining the second temperature.

8. The bread proofing oven according to claim 1, further comprising: a fan, wherein said controlling means is further adapted to operate said fan to control a temperature of said oven cavity.

9. The bread proofing oven according to claim 1, wherein the control panel is provided with at least one additional selector member for selecting between multiple bread proofing sequences.

10. In a cooking appliance including an oven cavity, at least one heating element disposed inside said oven cavity, and a control panel, mounted exteriorly of said oven cavity, including a bread proofing selector member, a method of proofing bread comprising:

A) elevating said oven cavity to a first temperature sufficient to activate yeast in bread dough;

B) reducing said oven cavity to a second temperature which is substantially below the first temperature; and C) maintaining the second temperature for a prerequisite period of time.

11. The method of claim 10, wherein said first temperature is approximately 200° F. (93° C.).

12. The method of claim 10, wherein step B includes reducing said oven cavity to between approximately 100° F. (37° C.) and 110° F. (43° C.).

13. The method of claim 12, wherein step B includes reducing said oven cavity to substantially 100° F. (37° C.).

14. The method of claim 10, wherein step C includes initiating the at least one heating element when the temperature of the oven cavity drops to approximately 98° F. (36° C.).

15. The method of claim 10, wherein step C includes ceasing the operation of the at least one heating element when the temperature of the oven cavity reaches approximately 105° F. (41° C.).

16. The method of claim 10, wherein step A includes operating the at least one heating element at a first voltage, and step C includes operating the at least one heating element at approximately one-half the first voltage.

17. The method of claim 10, further comprising: operating a fan to distribute air within said oven cavity.

18. The method of claim 10, further comprising: initially selecting between multiple bread proofing sequences.

19. In a cooking appliance including an oven cavity, at least one heating clement disposed inside said oven cavity, a control panel, mounted exteriorly of said oven cavity, including a bread proofing selector member, a method of proofing bread comprising:

A) elevating said oven cavity to a first temperature sufficient to activate yeast in bread dough;

B) reducing said oven cavity to a second temperature which is substantially below the first temperature;

C) maintaining the second temperature for a prerequisite period of time; and

D) automatically initiating a baking operation for the bread within the oven cavity following the proofing thereof.

20. The method of claim 19, further comprising: operating a fan to distribute air within said oven cavity.

* * * * *